United States Patent [19]

Nagy

[11] 3,709,415
[45] Jan. 9, 1973

[54] AUTOMATIC STRIPPING MACHINE
[75] Inventor: Alex Nagy, Aurora, Ohio
[73] Assignee: Betty M. Nagy, Aurora, Ohio
[22] Filed: Dec. 18, 1970
[21] Appl. No.: 99,539

[52] U.S. Cl. ...................................225/97, 93/36 A
[51] Int. Cl. ................................................B26f 3/00
[58] Field of Search.................225/97, 103; 93/36 A

[56] References Cited

UNITED STATES PATENTS

| | | | |
|---|---|---|---|
| 2,034,269 | 3/1936 | Price | 93/36 A X |
| 2,615,376 | 10/1952 | Pelikan | 93/36 A |
| 3,270,929 | 9/1966 | Foster, Jr. | 225/97 |
| 3,348,456 | 10/1967 | Marconet et al. | 93/36 A |
| 3,459,080 | 8/1969 | Goettsch | 93/36 A X |

Primary Examiner—Frank T. Yost
Attorney—Oberlin, Maky, Donnelly & Renner

[57] ABSTRACT

An automatic stripper for removal of die scored parts from a material web is disclosed in a process line, such automatic stripper including a substantially enclosed chamber through which the material web is transversed, and a rotatable beater element in said chamber having a plurality of peripherally spaced radially outwardly extending blades adapted to engage such die scored parts to separate the same from the web. The material web feed path past the beater element may variably be controlled by a tension device having a plurality of horizontally and vertically offset tension bars around one of which the web is directed.

7 Claims, 5 Drawing Figures

INVENTOR.
ALEX NAGY

BY

Oberlin, Maky, Donnelly & Renner
ATTORNEYS

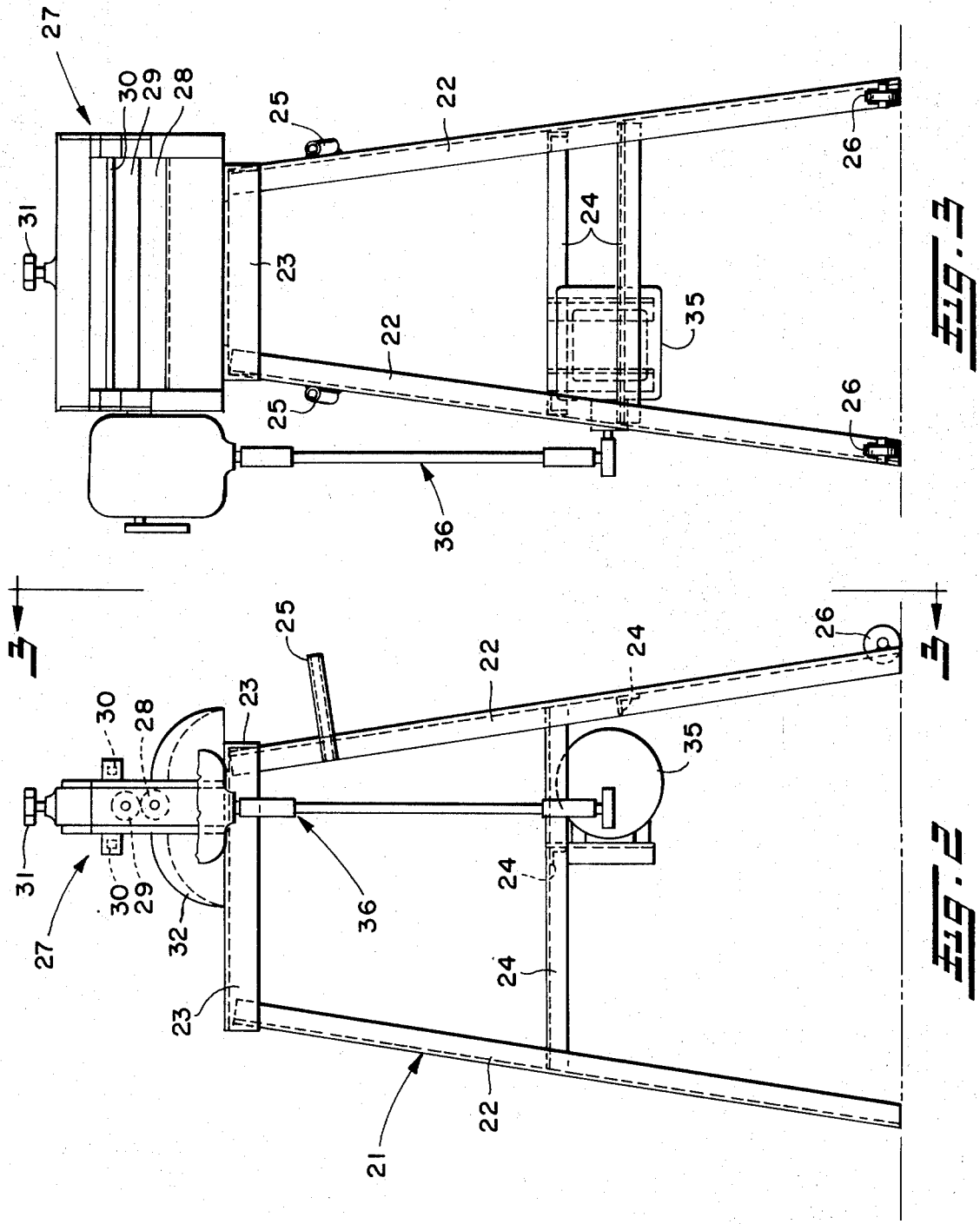

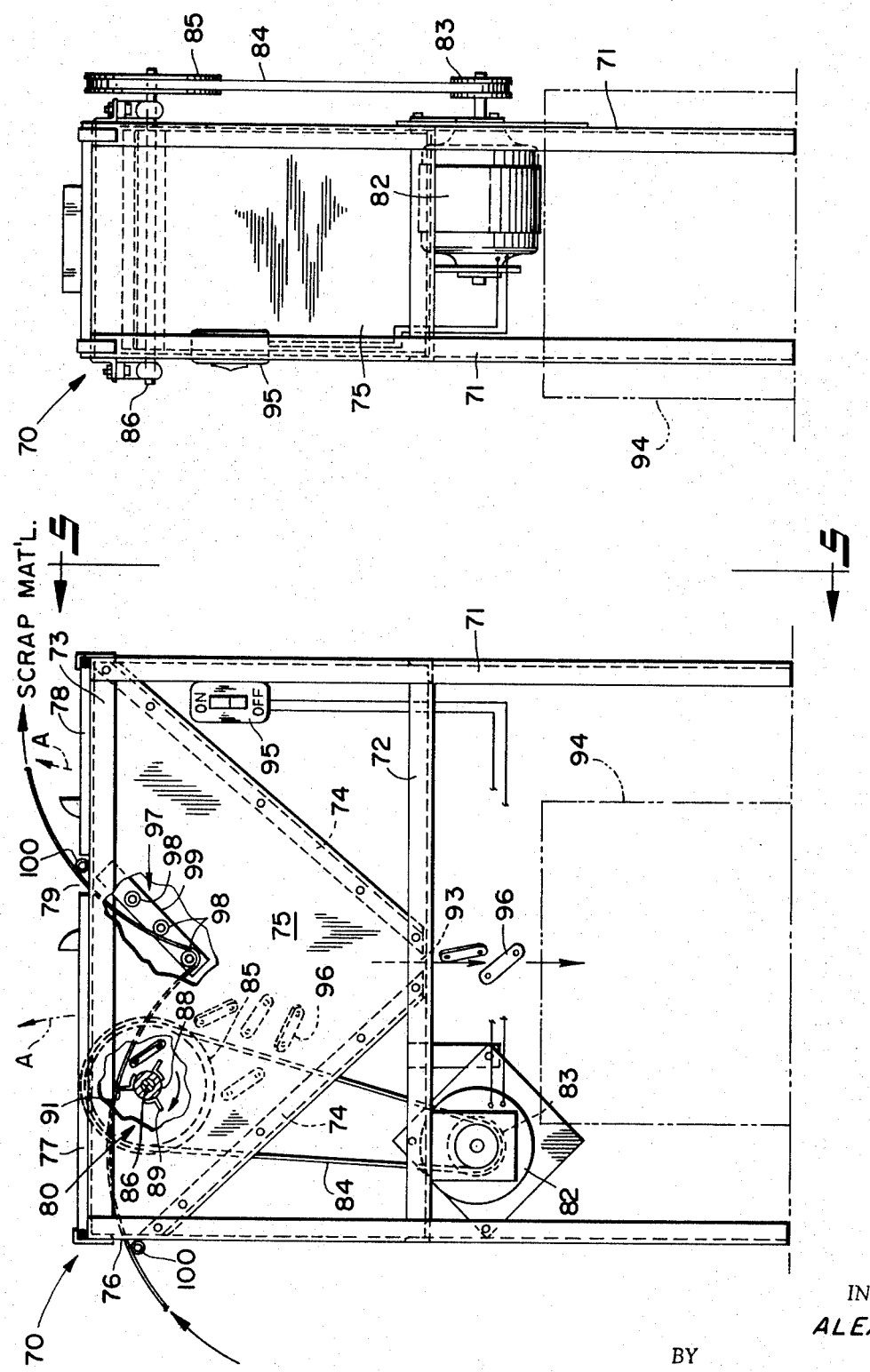

AUTOMATIC STRIPPING MACHINE

The present invention relates as indicated to a process and machinery therefor used in the manufacture of parts die-cut from strip material.

Prior methods of manufacturing similar parts generally require a discontinuous sequence of operator performed or controlled punching and manual separation steps. Such methods are costly in that personnel are required to run and maintain the available equipment. The manual separation step can be a tedious and time consuming job. Additionally, the accuracy of part production is of vital concern for obvious reasons, and such accuracy cannot ordinarily be maintained in prior methods due to human error in handling and treating of the strip material and removing parts therefrom.

Accordingly, it is the primary object of the present invention to provide a process for rapidly and efficiently manufacturing accurate die-cut parts.

It is still another object of the present invention to provide a process for manufacturing die-cut parts which is a controlled continuous sequence of moving the strip material through coating, cutting and separating steps.

Another important object of the present invention is to provide an apparatus for automatically separating the part from the strip.

It is another object of the present invention to provide a strip drive or feed machine which is adaptable to various processes, materials, and functions.

Other objects and advantages of the present invention will become apparent as the following description proceeds.

In the drawings:

FIG. 2 is a side elevation partially broken away of an automatic material feed machine used in the process;

FIG. 3 is an end elevation of the feed machine, taken along line 3—3 of FIG. 2;

FIG. 4 is a side elevation partially broken away of a stripping machine of the present invention; and FIG. 5 is a side elevation of the stripping machine, taken along line 5—5 of FIG. 4.

Figure 1:
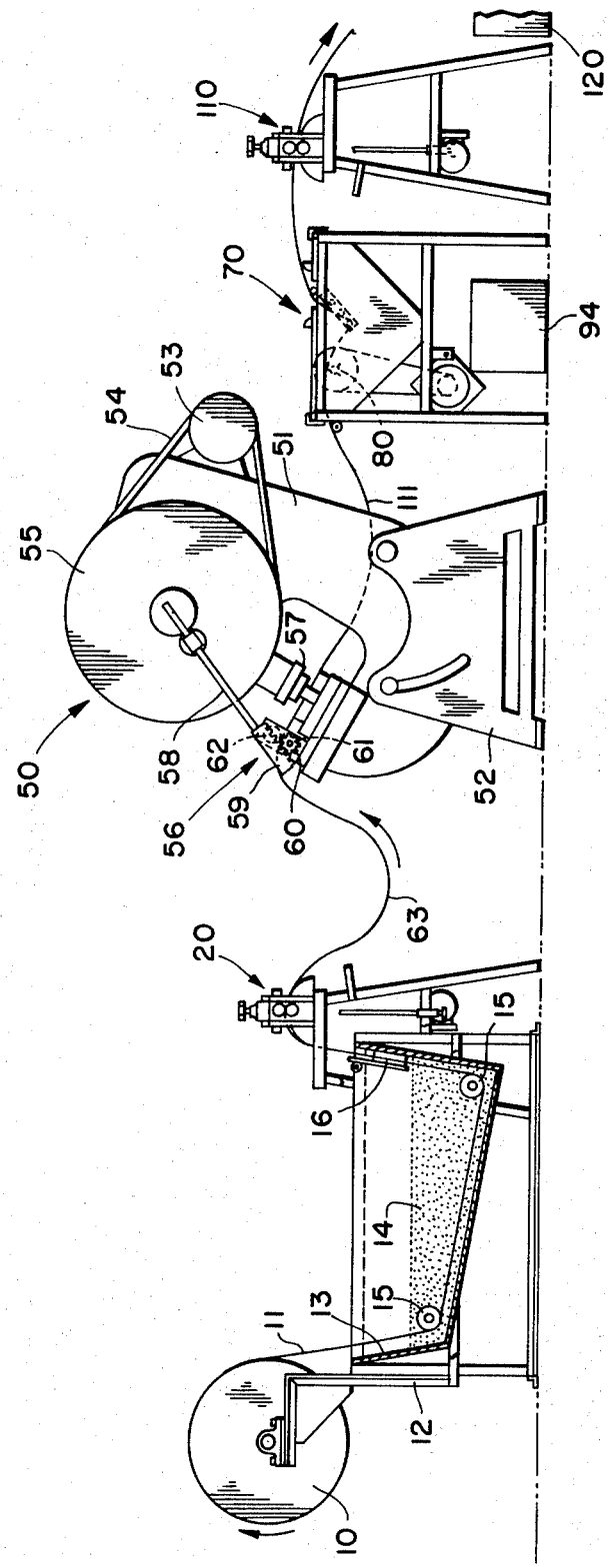
FIG. 1 is a schematic side elevation partially broken away and in section of the process of the instant invention for producing die-cut parts from a strip.

Referring now in more detail to the drawings, and initially to FIG. 1, the process for manufacturing die-cut parts such as gaskets or the like is schematically illustrated. Such process is adapted to the manufacture of any part which may be produced from a strip material stock, such as rubber, fiberboard, cork, cardboard or the like.

The process has as its first step the provision of a relatively large cylindrical storage coil 10 for strip material 11. The axle of the coil 10 is rotatably mounted in suitable bearings mounted on frame 12. Such frame 12 has mounted thereupon a hopper 13 preferably having an inclined bottom surface as shown. The hopper may be partially filled with talcum powder, used particularly with rubber parts, through which the strip 11 is passed. The path of the strip through the talcum powder is controlled by idler rollers 15 mounted between the side walls of hopper 13. Such rollers 15 are positioned so that they are elevated slightly above the inclined bottom wall of the hopper.

A wiper assembly 16 is provided at the top of hopper 13 to remove excess powder. As shown, such assembly comprises two opposed pads disposed in pressing engagement with the surfaces of such strip, the outer pad being pivotally mounted and removable.

The strip is withdrawn from the hopper assembly by an automatic material feed machine, indicated generally at 20. Such feeder acts in conjunction with the drive means on punch press 50 continuously to transfer strip 11 therebetween. The details of feeder 20 will be fully set forth hereinafter in the discussion of FIGS. 2 and 3.

The punch press 50, in the form shown, comprises a generally U-shaped body portion 51 pivotally connected to supporting cradle frame member 52, such body portion being adapted to be inclined at various angles. Motor 53 is mounted on the body member and drives V-belt 54 which is operatively connected to flywheel 55. Such flywheel controls the drive means, indicated generally at 56, and the movement of punch 57 in a manner to be set forth hereinafter.

The drive means 56 includes a rod 58 which on one end is eccentrically mounted to flywheel 55 and on the other end is provided with rack 59. The rack cooperates with pinion 60 which is on one end of bottom pinch roll 61. The pinion is connected to such roll by an overrunning or one-way clutch. The bottom roll cooperates with top pinch roll 62 and the strip 11 passes through the nip of such rolls. Thus, the strip is intermittently or cyclicly fed to the right by drive means 56.

The punch 57 is also reciprocated by flywheel 55, in a well known manner, so that the punch contacts the strip only when the same is stationary. By having the strip 11 stationary, clean cuts or scores may be made therein without distortion. It is apparent that different punches may be associated with the press for the manufacture of a variety of parts.

The punch press described is only indicative of but one form of many which may be employed in the process.

The scored or cut strip is drawn from the press 50 through stripping machine 70 by a second feed machine 110, which may be of the same construction as feeder 20. When the strip 11 moves through such stripping machine, the die-cut parts are removed from the material web by a rotary beater 80. The parts thus removed in the stripper are gravity fed therefrom to a suitable receptacle 94 for packaging. Strip material 11 with the parts removed therefrom is drawn out of the stripper 70 and fed as scrap material to storage bin 120.

Due to the physical characteristics of the strip material handled, it is necessary to keep a certain amount of slack in the strip throughout the process so that such material will not be in any way stretched or deformed. This ensures that the resultant die-cut parts will be uniformly manufactured within acceptable dimensional tolerances. The slack is maintained by controlling closely the speeds of the three drive or feed means used in the process. This speed relationship allows the formation of slack loop 63, between drive means 20 and press 50, and slack loop 111, between press 50 and stripping machine 70. The drive means can be either operator controlled according to a visual inspection of the slack loop formations on the process line or automatically controlled by a feedback circuit actuated by dancer rolls, sensors or the like associated with slack loops 63 and 111.

Referring now to FIGS. 2 and 3, the automatic material feed machine 20 includes a frame, indicated generally at 21, which comprises four legs 22, four top members 23, and four lower support members 24. Handles 25 and wheels 26 are connected to two of the legs 22 in a suitable manner, such wheels being added for the purpose of making such machine portable. As can be seen from the vertical positioning of the wheels shown in FIGS. 2 and 3, such wheels are effectively braked by the bottom surface of the two legs 22 to which they are mounted in the upright position of the machine. However, when it is desired to move the feed machine, the frame may be pivoted about the axis of the wheels by pulling rearwardly on handles 25, thereby placing the entire load on the wheels for easy movement of such feeder.

The feed unit indicated generally at 27, is asymmetrically mounted on top members 23 of frame 21. Such unit includes a pinch roller drive through the nip of which strip 11 is fed, such roller drive comprising a lower, powered roller 28 and a vertically offset upper roller 29. Roller spacing and thus nip pressure may be controlled by knob 31 and jamming may be avoided by a quick separation of such rolls through actuation of either of the release bars 30 disconnecting the top roll. A strip guide 32 having an essentially semi-circular guiding surface is connected to the frame below rollers 28 and 29.

The lower roller 28 is driven by a motor 35, the base of which is secured to a support member 24 or otherwise suitably connected to the frame. Such motor 35 is operatively coupled to the lower roll 28 in any well known manner such as by the right angle drive and transmission shown generally at 36. The speed of motor 35 and therefore angular velocity of roller 28 is controlled either by a unit, not shown, suitably mounted on the machine for operator control or by an automatic feedback control system measuring strip velocity elsewhere in the process line and accordingly controlling the speed of motor 35 to effectuate the desired process throughput characteristics. For increased process adaptability, the motor may be reversed so that a strip may be fed through the machine in the opposite direction. Thus as shown in FIG. 1, the same feed machine can be used for different purposes in the same process line as indicated by feeders 20 and 119.

Referring now to FIGS. 4 and 5, the stripping machine 70 for removal of the die-cut parts from the strip or material web is illustrated in detail. The frame thereof is formed by four vertical angle members 71 joined by vertically offset sets of horizontal and parallel angle members 72 and 73. A hopper is formed in the frame by angularly inclined frame members 74 supporting suitable paneling such as plywood or sheet metal, indicated at 75. The front panel of such hopper is vertically below the top extremity of the opposing back panel, whereby such front panel defines with the adjacent top angle 73 a strip entry aperture indicated at 76. Across the top of the frame, two doors 77 and 78 are provided which are of such length as to provide a transverse opening 79 therebetween for the egress of material web 11. Such doors define with the hopper and frame an enclosed stripping chamber and may be pivoted upwardly as indicated by the arrows A to provide ready access to such stripping chamber.

The rotary beater element for removing the parts is indicated generally at 80. The beater element includes a cylindrical core 88 mounted upon shaft 86, such member having a plurality of annularly spaced, outwardly extending blades 89 connected thereto. As illustrated, each blade comprises one leg of a longitudinally extending angle which is welded or otherwise suitably connected along its other leg to the core 88.

The shaft 86 of beater element 80 extends through the side panels and is secured to the underside of frame members 73. It is driven by a power train from frame carried motor 82. Such power train includes pulley 83 connected to the output shaft of motor 82, pulley 85 connected to such shaft 86 of the beater element, and V-belt 84 operatively connected between such pulleys. As such beater element is rotated relatively rapidly, the blades are adapted to contact or beat the strip moved therepast as indicated at 91, thereby removing the scored or cut areas from the strip to produce the end product or part 96. The parts thus removed fall into the hopper and are gravity fed through aperture 93 into an article receiving bin indicated at 94.

The extent of the wrap of the strip material 11 as it is drawn across the beater element 80 may be varied by the apparatus indicated generally at 97. Such apparatus comprises a plurality of horizontally and vertically offset tension bars 98 mounted upon an inclined frame connected bracket 99. As can readily be appreciated, by merely threading the strip 11 around a different tension bar, the wrap of the strip about the beater may be varied. Additional guide members can be used to guide the strip material through such machine and are indicated generally by the common reference numeral 100.

A switch 95 is mounted on the frame for energizing or deenergizing the motor 82. Moreover, additional motor control means, not shown, may be employed to vary the speed of such motor and therefore the angular velocity of the beater member 80.

Other modes of applying the principle of the invention may be employed, change being made as regards the details described, provided the features stated in any of the following claims or the equivalent of such be employed.

The embodiments of the invention in which an exclusive property or privilege is claimed are defined as follows:

1. An automatic stripping machine for removing die scored parts from a material web moving therepast comprising a frame, stripping means mounted on said frame adapted to separate the die scored parts from the web and tension means selectively for varying the feed path of the web past the stripper means, such tension means comprising a plurality of horizontally and vertically staggered tension bars around one of which the strip is directed.

2. An automatic stripping machine as set forth in claim 1 wherein said stripping means includes a rotating member having a plurality of annularly spaced, outwardly extending blades which successively come in contact with such strip drawn therepast.

3. An automatic stripping machine as set forth in claim 1 wherein said frame has a hopper associated therewith, said hopper receiving said die scored parts which have been removed from said strip.

4. An automatic stripping machine as set forth in claim 3 wherein said hopper is frame mounted and positioned beneath said stripping means, said hopper having an aperture at the bottom thereof for aligning and gravity feeding said parts from said stripping machine.

5. An automatic stripping machine as set forth in claim 4 wherein said frame has a pivoted top cover, said cover, frame and hopper defining an enclosed stripping chamber, said stripping means being contained therein.

6. An automatic stripping machine as set forth in claim 5 wherein said stripping chamber has a horizontally oriented and transversely extending strip entry aperture, and wherein said top cover comprises two door members pivotally attached to the top of said frame member and defining between the ends thereof a transversely extending strip egress aperture, said stripping means being positioned below said door members.

7. An automatic stripping machine as set forth in claim 5 wherein said tension means is positioned in said stripping chamber downstream of said stripping means.

* * * * *